Inventor:
Glen H. Morey

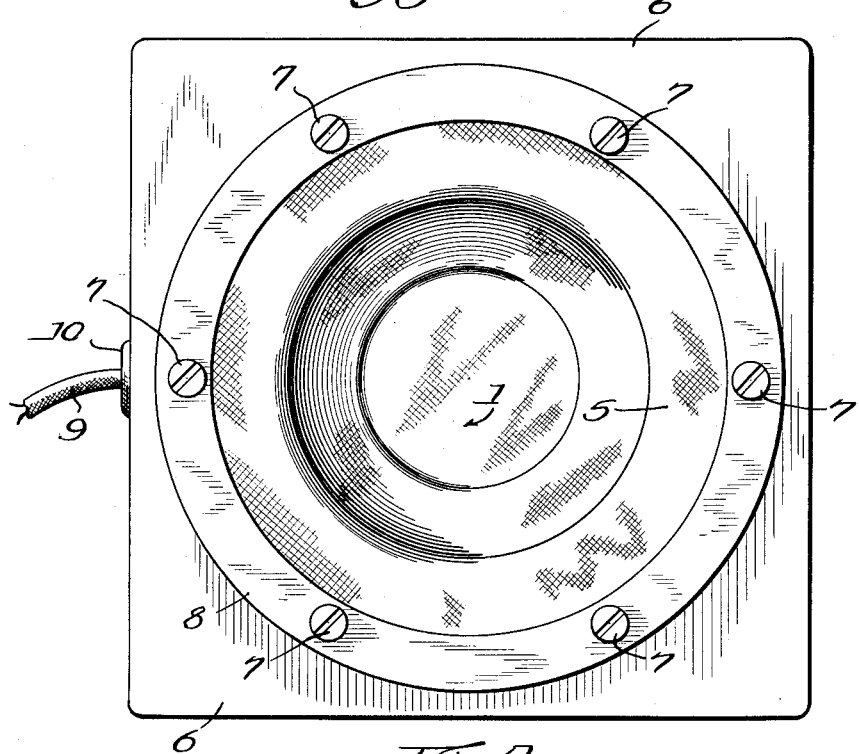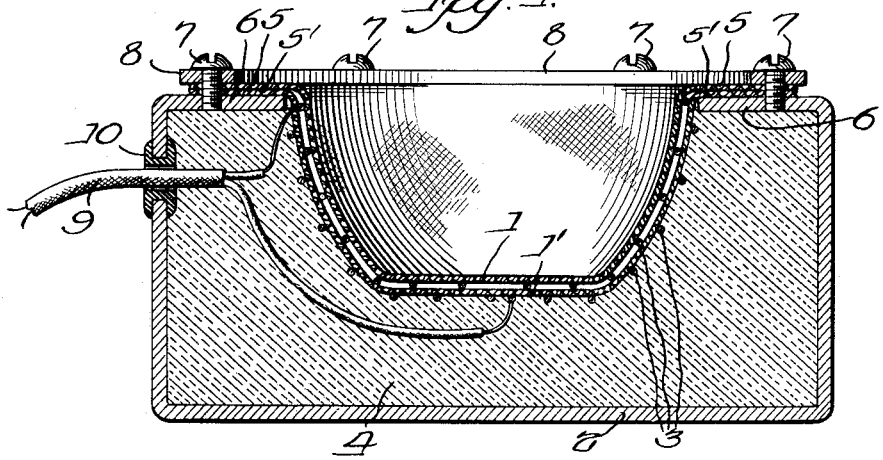

Patented May 5, 1942

2,282,078

UNITED STATES PATENT OFFICE 2,282,078

ELECTRICAL HEATING DEVICE

Glen H. Morey, Terre Haute, Ind.

Application September 20, 1940, Serial No. 357,621

9 Claims. (Cl. 219—44)

My invention relates to heating devices, and more particularly to heating devices adapted to heat glass or other fragile vessels.

In my co-pending application Serial No. 271,057, filed May 1, 1939, I have described a heating device especially adapted for heating glass distilling flasks. This device is a completely flexible structure which is especially advantageous from the standpoint of protecting the vessel from mechanical shock. However, in view of its flexible nature, this device must be supported by the vessel itself, or special supporting means of necessarily complicated structure must be provided.

An object of my present invention, therefore, is to provide a heating device for glass or other fragile vessels which may itself support the vessel. A further object of my invention is to provide such a device which will not only support the vessel, but will at the same time provide only a flexible, resilient surface in contact with the vessel and thus protects it from external mechanical shocks or from shocks caused by "bumping" of liquids boiling in the vessel. Another object of my invention is to provide a heating device of this character having general application for heating vessels in laboratory and industrial use, and for heating home utensils such as vacuum coffee makers and the like. Additional objects and advantages of my invention will be evident from the following description.

In the drawings, wherein like reference characters indicate like or corresponding parts:

Fig. 3 is a view similar to Fig. 1 of a modified form of the invention; and

Fig. 4 is a transverse sectional view of the device illustrated in Fig. 3.

The heating device of my present invention comprises, briefly, an inner member formed of flexible woven fireproof fabric shaped to conform closely to the exterior of at least the lower portion of the vessel to be heated, a substantially rigid outer member surrounding the inner member, and a cushioning layer of resilient heat insulating material interposed between said inner and outer members. An electrical heating element is provided, which preferably comprises a helical resistance element attached to the woven structure of the inner member in such a manner that it cannot short-circuit on flexing of said inner member.

Figure 1:
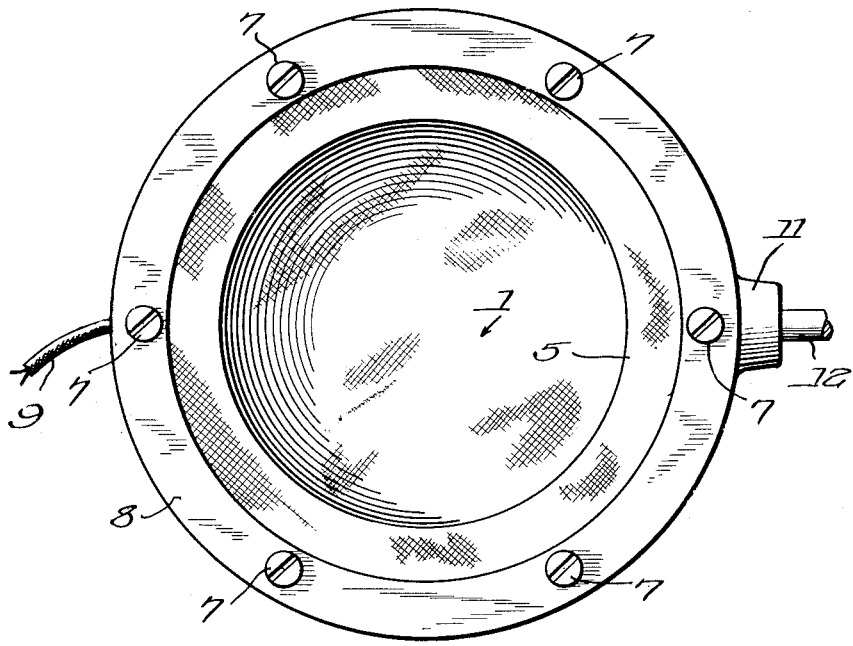
Fig. 1 is a top plan view of a heating device embodying the present invention.

A preferred modification of my invention is illustrated in Fig. 1 of the accompanying drawings, representing top and cross-sectional views of a heating device adapted to heat vessels of substantially spherical lower sections, such as distilling flasks and the like. As may be seen from the drawings, the heating device comprises, as its main elements, an inner member 1, an outer member 2, a heating element 3, and resilient heat insulating material 4 interposed between said inner and outer members.

The inner member 1 is formed of flexible woven fireproof fabric such as glass cloth, and is shaped to fit the vessel to be heated, by stretching over a form, taking tucks or making darts in the fabric, or cutting a multi-lobed pattern which, on sewing together, will form the desired shape. The fabric is preferably cut in such a manner as to provide an outwardly extending annular lip 5, at the periphery of the vessel-receiving opening of the formed member 1.

The outer member 2 may suitably be formed of metal, and may be cast, drawn, or spun to conform approximately to the shape of the inner member 1. The outer member 2 is provided with an inwardly extending annular lip 6, adapted to engage the annular lip 5 of the inner member 1. The lip 6 may suitably be drilled and tapped to receive screws 7 which serve to hold a clamping ring 8 against the annular lip 5. The annular fabric lip 5 of the inner member 1 is thus clamped between the ring 8 and the annular lip 6 of the outer member 2.

Between the inner member 1 and the outer member 2 is interposed resilient heat insulating material 4, which may comprise asbestos fibers, glass wool, slag wool, "85% magnesia" in comminuted form, or other similar materials. The material 4 may suitably be packed, matted, or felted into a substantially uniform cushion to provide resilient support for the inner member 1 at all points where said member contacts the vessel to be heated.

The electrical heating element 3 preferably comprises a helical resistance element affixed to the inner member 1, with its turns so spaced and locked to the woven structure of the member 1 as to prevent short-circuiting on flexing of the said member 1. The heating element 3 may be attached to the member 1 in any suitable manner to effect this end, for example, simply by stitching the resistance element to the fabric by means of fireproof thread such as thread formed of glass fibres. The power leads 9 for the heating element 3 may pass through a suitable opening in the member 2, which is preferably provided with an insulating grommet 10.

Any desired type of mounting means may be provided for the heating device. A convenient form for laboratory uses of these heaters is illustrated in Fig. 1. This comprises a boss 11, which may, for example, be cast integrally with the member 2, and which is drilled and tapped to receive a threaded rod 12 of the standard type adapted to be clamped in laboratory ring-stand clamps.

Figure 2:
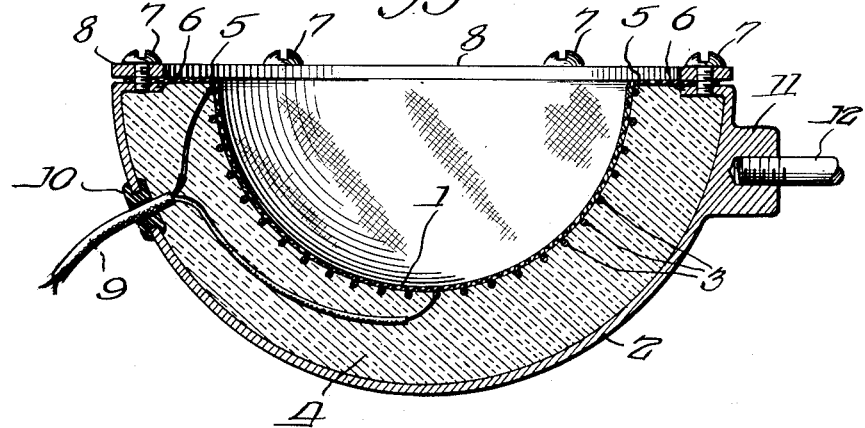
Fig. 2 is a transverse sectional view through the device illustrated in Fig. 1.

Another modification of my heating device is illustrated in Fig. 2 of the accompanying drawings, representing top and cross-sectional views of a heater especially adapted for heating vacuum coffee makers. This modification differs from that of Fig. 1 in that the outer member 2 is a box-like structure providing its own supporting base, and the inner member is formed of two layers of fireproof fabric 1 and 1', rather than merely a single layer. In this case the outer member 2 may suitably be molded of heat-resistant plastic, or may be formed of other heat-resistant material such as asbestos board. The member 2 may also be formed of metal as in the previous modification, or, on the other hand, may be formed of material of low heat resistance if sufficient heat insulating material 4 is provided. The provision of a double layer of fabric 1—1' comprising the inner member enables the electrical heating element 3 to be fixed in position by stitching the resistance wire into the woven structure of the layer 1'. By thus stitching or weaving the wire into the fabric layer 1', the separate turns are securely locked in non-shorting relationship. When employing the double layer of fabric 1—1', both layers are preferably provided with annular lips 5—5' for clamping between the ring 8 and the annular lip 6 of the outer member 2.

In the operation of either of the devices described above, the vessel to be heated is merely placed in the heater, resting on the inner member 1, the leads 9 are connected to a power source, and sufficient current is passed through the resistance element 3 to heat the contents of the vessel to the desired degree. When boiling liquids with these heating devices, the very uniform heating which is provided reduces to a marked extent the "bumping" which is otherwise normally encountered, and the resilient construction provided by the flexible inner member 1 and the cushioning material 4 adequately protects the vessel from the mechanical shocks due to such "bumping" as may occur. This resilient construction of the interior of the heating devices, coupled with the protective, rigid outer construction, also provides adequate protection for the vessel from external mechanical shocks.

It is to be understood, of course, that the particular heating devices described above are merely illustrative, and do not limit the scope of my invention. Various equivalent constructional materials may be employed, as, for example, the use of fabrics formed of asbestos, slag, or rock fibres instead of glass fibres. Various modifications of construction will also be evident to those skilled in the art, as, for example, the provision of other clamping or attaching means for affixing the inner fabric member to the rigid outer member of the device. Also, it will be apparent that two or more units may be provided in order to heat the upper as well as the lower portions of any vessel. In general, it may be said that the use of any such modifications, and the use of any equivalents which would normally occur to one skilled in the art are included in the scope of my invention.

My invention now having been described, what I claim is:

1. A heating device adapted to receive and support a glass vessel and heat the same, comprising an inner member formed of at least one layer of flexible woven fireproof fabric shaped to conform closely to the exterior of the lower portion of said vessel, a substantially rigid outer supporting member surrounding said inner member but spaced from the vessel contacting portion thereof, means for attaching said inner member at the periphery of its vessel-receiving opening to said outer supporting member, an electrical heating element affixed to the woven structure of said inner member in spaced and non-shorting relationship, and resilient heat insulating material interposed between said inner and outer members to provide resilient support for said inner member and for said vessel, and to protect said vessel from mechanical shock.

2. The heating device of claim 1 in which the inner member is formed of flexible woven glass cloth.

3. The heating device of claim 1 in which the inner member is formed of flexible woven glass cloth and the heat insulating material comprises glass wool.

4. A heating device adapted to receive and support a glass vessel and heat the same, comprising an inner member formed of at least one layer of flexible woven fireproof fabric shaped to conform closely to the exterior of the lower portion of said vessel, a substantially rigid outer supporting member surrounding said inner member, said outer member having an inwardly extending lip adapted to engage the edge of said inner member at the periphery of its vessel-receiving opening, clamping means adapted to co-operate with said lip and hold the peripheral edge of said inner member against said lip by pressure engagement, an electrical heating element interposed between said inner and outer members in spaced and non-shorting relationship, and resilient heat insulating material interposed between said inner and outer members to provide resilient support for said inner member and for said vessel, and to protect said vessel from mechanical shock.

5. The heating device of claim 4 in which the inner member is formed of flexible woven glass cloth.

6. The heating device of claim 4 in which the inner member is formed of flexible woven glass cloth, and the heat insulating material comprises glass wool.

7. A heating device adapted to receive and support a glass vessel and heat the same, comprising an inner member formed of at least one layer of flexible woven fireproof fabric shaped to conform closely to the exterior of the lower portion of said vessel and having an outwardly extending annular lip at the periphery of its vessel-receiving opening, a substantially rigid outer supporting member surrounding said inner member and spaced therefrom, clamping means for attaching the outwardly extending annular lip of said inner member to said outer supporting member, an electrical heating element interposed between said inner and outer members and affixed to the woven structure of said inner member in spaced and non-shorting relationship, and resilient heat insulating material interposed between said inner and outer members whereby said inner member is cushioned by said resilient material at all points of contact with said vessel.

8. The heating device of claim 7 in which the inner member is formed of flexible woven glass cloth.

9. The heating device of claim 7 in which the inner member is formed of flexible woven glass cloth and the heat insulating material comprises glass wool.

GLEN H. MOREY.